(12) United States Patent
Dashevskiy et al.

(10) Patent No.: US 10,785,369 B1
(45) Date of Patent: Sep. 22, 2020

(54) MULTI-FACTOR SCAM CALL DETECTION AND ALERTING

(71) Applicant: T-Mobile USA, Inc., Bellevue, WA (US)

(72) Inventors: Tatiana Dashevskiy, Edmonds, WA (US); Rami Al-Kabra, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/584,744

(22) Filed: Sep. 26, 2019

(51) Int. Cl.
 *H04M 3/38* (2006.01)
 *H04M 3/22* (2006.01)
 *H04M 3/42* (2006.01)

(52) U.S. Cl.
 CPC ....... *H04M 3/2281* (2013.01); *H04M 3/2218* (2013.01); *H04M 3/42042* (2013.01); *H04M 2203/6027* (2013.01)

(58) Field of Classification Search
 CPC ........... H04M 3/2281; H04M 3/42042; H04M 2203/6027
 See application file for complete search history.

(56) References Cited

U.S. PATENT DOCUMENTS

| | | | |
|---|---|---|---|
| 2017/0134574 A1 | 5/2017 | Winkler | |
| 2017/0142252 A1* | 5/2017 | Bhupati | H04M 19/04 |
| 2017/0302794 A1 | 10/2017 | Spievak et al. | |
| 2018/0007199 A1 | 1/2018 | Quilici et al. | |
| 2018/0249005 A1* | 8/2018 | Dowlatkhah | H04M 3/436 |
| 2018/0295236 A1 | 10/2018 | Ansari | |
| 2019/0281157 A1* | 9/2019 | Gupta | H04M 3/2281 |
| 2019/0335036 A1* | 10/2019 | Sharpe | H04M 3/38 |
| 2020/0162602 A1* | 5/2020 | Rakshit | H04M 3/42093 |

* cited by examiner

*Primary Examiner* — Dai Phuong
(74) *Attorney, Agent, or Firm* — Han Santos, PLLC

(57) ABSTRACT

Call record data for telephone numbers of callers are received. A telephone number of a caller is determined as used to place a telephone call to a recipient telephone number of a call recipient. The call record data are analyzed using graph analytics to generate a reliability score for the telephone number that represents a likelihood that the caller is known to the call recipient. The call record data are analyzed using entropy analysis to generate a behavior score for the telephone number that represents a behavior trustworthiness of the caller. The reliability score, the behavior score, and the telephone number of the caller are sent to a user device of the call recipient for the user device to generate a first indication that represents a value of the reliability score and a second indication that represents a value of the behavior score for display along with the telephone number.

20 Claims, 11 Drawing Sheets

MULTI-FACTOR SCAM CALL DETECTION AND ALERTING

BACKGROUND

Users of telecommunication devices receive multiple voice calls throughout the day. Caller ID is a feature that enables users to know who a caller is before the user picks up the phone. However, the information provided by a caller ID feature is generally limited. For example, caller ID may show a telephone number and if available, a pre-registered name and/or geographical location associated with the telephone number. In some instances, such information may be sufficient for a user to identify the caller and decide whether to take or reject an incoming call. However, in other instances, such information may provide insufficient context for a user to decide whether to take or reject the call.

In order to assist users with differentiating between wanted and unwanted calls, a wireless carrier network may implement a scam alerting function on its core network. The scam alerting function may make use of a scam telephone number database that contains a list of suspicious telephone numbers. The suspicious telephone numbers are previously identified by the wireless carrier network as being associated with fraudulent or nefarious call activities. Accordingly, when an incoming call destined for a user device of a call recipient is identified via the scam telephone number database as a suspicious telephone number, the scam alerting function may cause the user device to display a warning message along with the suspicious telephone number when the user device is presenting an incoming call notification. However, the scam telephone number database may not have a complete list of all suspicious telephones used by scammers. Further, in some instances, scammers are able to defeat the scam alerting function by spoofing telephone numbers of innocent third-parties when making scam calls.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
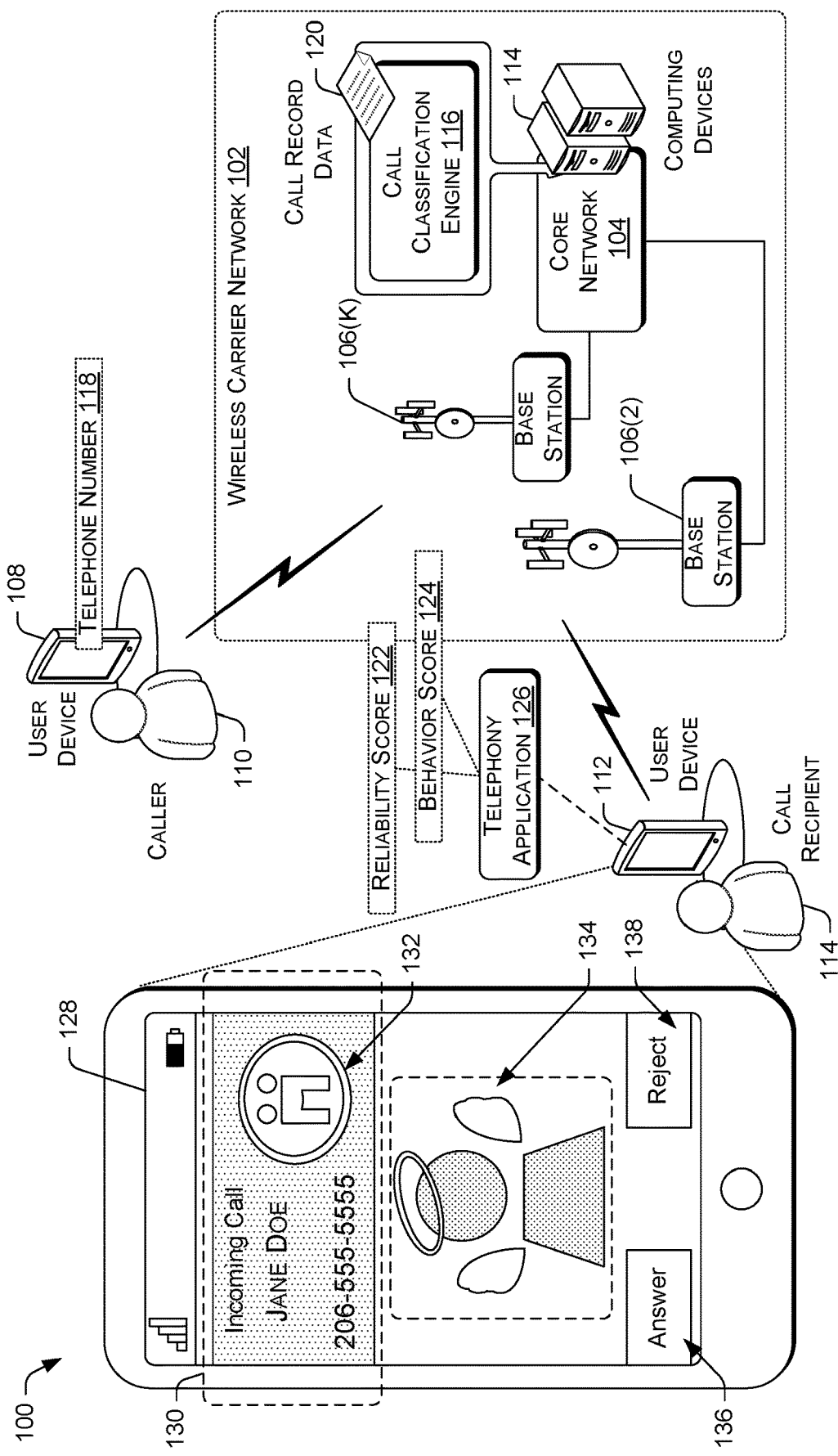
FIG. 1 illustrates an example wireless carrier network architecture that implements multi-factor scam call detection and alerting.

This disclosure is directed to techniques for providing multi-factor scam call detection and alerting to a call recipient that is receiving an incoming call on a user device of the call recipient. In various embodiments, a call classification engine of the wireless carrier network may analyze call record data of callers to generate a reliability score and a behavior score for a caller that is placing an incoming call to a caller recipient who is a subscriber of the wireless carrier network. In various embodiments, the call record data is analyzed via graph analytics to generate a reliability score for a telephone number of the caller. For example, the reliability score may represent a likelihood that the caller is someone that is known to the call recipient. The caller record data is further analyzed via entropy analysis to generate a behavior score for the caller. For example, the behavior score may represent a behavior trustworthiness of the caller.

Subsequently, the wireless carrier network may send the reliability score, the behavior score, and the telephone number of the caller to the user device of the call recipient as a part of an incoming call notification messaging to the user device. In turn, the user device may present an incoming call notification interface that displays a first indication that represents a value of the reliability score and a second indication that represents a value of the behavior score. For example, each of the indications may include a color, an icon, or a combination of a color and an icon that corresponds to the value of the score. The incoming call notification interface may present other information regarding the caller, such as a telephone number of the caller, a geographical location (e.g., city, state information) associated with the telephone number of the caller, and/or a name associated with the caller. In this way, the call recipient may have sufficient information to use the incoming call notification interface to answer or reject the incoming call from the caller.

In some instances, the call classification engine of the wireless carrier network may receive feedback regarding a caller from a call recipient that enables the call classification engine to refine the reliability score and the behavior score that are generated with respect to the caller for the call recipient. For example, a user device of a call recipient may be configured to provide a feedback interface after the call recipient terminates an answered call with a caller. The feedback interface may ask the call recipient to answer whether the answered call was, in fact, a wanted call (e.g., a non-scam call) or an unwanted call (e.g., a scam call). Such feedback regarding the caller may be used by the call classification engine to modify the reliability score and/or the behavior score generated for future telephone calls from the caller the call recipient.

In some embodiments, the reliability scores and the behavior scores of the callers may be used by the call classification engine to generate analysis reports. For example, the call classification engine may generate a visual map of the geographical locations of the suspected scam telephone numbers. In another example, the call classification engine may analyze the call record data of a scam telephone number to determine whether the telephone number is being spoofed by a scammer. For example, the telephone number may be spoofed when the telephone number appears to simultaneously originate multiple calls to different call recipients. Thus, if the telephone number being spoofed belongs to a subscriber of the wireless carrier network and the frequency of spoofing exceeds a frequency threshold, the call classification engine may generate a report that prompts a customer service representative to contact the subscriber to resolve the issue. For example, the customer service representative may offer to assign the subscriber an alternative telephone number and then add the telephone number being spoofed to a list of scam telephone numbers.

The use of the multiple indications on an incoming call notification interface that correspond to a reliability score and a behavior score may provide a call recipient with more information than solely available from a caller ID function or a scam alerting function. The additional information may enable a call recipient to make a more informed decision as to whether to reject or to answer an incoming call from the caller. The provision of such useful information to a call recipient may increase user satisfaction with a mobile network operator (MNO) that operates the wireless carrier network. The techniques described herein may be implemented in a number of ways. Example implementations are provided below with reference to the following figures.

Example Architecture

FIG. 1 illustrates an example wireless carrier network architecture 100 that implements multi-factor scam call detection and alerting. The wireless carrier network 102 may include a core network 104 and a radio access network. The radio access network may include multiple base stations, such as base stations 106(1)-106(K). Each of the base stations 106(1)-106(K) may provide a corresponding network cell that delivers telecommunication and data communication coverage. The core network 104 may use the network cells to provide wireless communication services to user devices. The core network 104 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 104 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as communication with backend servers in the core network 104.

Accordingly, the base stations 106(1)-106(K) are responsible for handling voice and data traffic between user devices and the core network 104, such as a user device 108 of a caller 110 and a user device 112 of a call recipient 114. In various instances, the user devices may include smartphones, tablet computers, and/or other wireless communication devices that can be used to make and receive voice telephone calls.

The backend servers of the core network 104 may execute a call classification engine 116. The call classification engine 116 may analyze the call record data of callers that are serviced by the wireless carrier network 102. The analysis may enable the call classification engine 116 to generate a reliability score and a behavior score for a caller that is placing an incoming call to a caller recipient who is a subscriber of the wireless carrier network. The call record data of individual callers may include call detail records (CDRs) that contain various attributes of calls made by the individual callers. The attributes of a call may include a start time and date of the call, a duration of the call, a completion status of the call, a source telephone number of the call, a destination telephone number of the call, a route by which the call entered the wireless carrier network 102, a route by which the call left the wireless carrier network 102, a call type of the call (e.g., voice, multimedia, etc.), a disposition of the call (e.g., whether the call was connected, sent to voicemail, etc.), and/or any fault conditions associated with the call. In various embodiments, the call classification engine 116 may obtain the call record data from one or more systems in the core network 104, such as an Online Charging System (OCS), a Business Support System (BSS), an Operations Support System (OSS), and/or so forth.

In one instance, the caller 110 may use the user device 108 to place an incoming call using a telephone number 118 to the user device 112 of the call recipient 114. As the call routes to the core network 104, the call classification engine 116 may use graph analytics and entropy analysis to analyze call record data 120 of the callers serviced by the wireless carrier network 102. The application of graph analytics to the call record data 120 may generate a reliability score 122 for the telephone number 118 of the caller 110. The reliability score 122 may represent a likelihood that the caller 110 is someone that is known to the call recipient 114. Likewise, the application of the entropy analysis to the call record data 120 may generate a behavior score 124 for the telephone number of the caller. The behavior score 124 may represent a behavior trustworthiness of the caller.

Subsequently, the core network 104 may send the reliability score 122, the behavior score 124, and the telephone number 118 of the caller 110 to the user device 112 of the call recipient 114 as a part of an incoming call notification messaging to the user device 112. In some embodiments, the messaging may be performed using the Session Initiation Protocol (SIP), the Hypertext Transfer Protocol (HTTP), and/or so forth. In turn, a telephony application 126 on the user device 112 may present an incoming call notification interface 128 that displays a first indication that represents a value of the reliability score 122 and a second indication that represents a value of the behavior score 124. Each of the indications may include a color, an icon, or a combination of a color and an icon that corresponds to a score. Further, the incoming call notification interface 128 may present caller information regarding the caller 110, such as the telephone number 118 of the caller 110, a geographical location (e.g., city, state information) associated with the telephone number of the caller 110, and/or a name associated with the caller 110.

For example, the incoming call notification interface 128 may include a portion 130 that presents the caller information. The portion 130 may further contain an icon 132 that represents a value of the reliability score 122. In the example shown in FIG. 1, the icon 132 may indicate that the caller 110 is known to the call recipient 114, i.e., a friend rather than a stranger. The icon 132 may be one of multiple icon variations that are used to indicate the closeness of the relationship between the caller 110 to the call recipient 114 based on the value of the reliability score 122. For example, the reliability score 122 may have a numerical range of 1-10 that correspond to degrees of relationship proximity, in which "1" indicates the caller 110 is a stranger, and "10" indicates the caller 110 is a friend. Accordingly, the telephony application 126 may present a first variation of the icon 132 for the values 1 and 2, a second variation of the icon 132 for the values 3 and 4, a third icon for the values 5 and 6, a fourth variation of the icon 132 for the values 7 and 8, and a fifth variation of the icon 132 for the values 9 and 10. However, the reliability score 122 may have other numerical ranges in other embodiments, and the number of icon variations that correspond to different numerical subranges may also vary.

In some instances, each icon variation for the behavior score 124 may be accompanied by a corresponding color indicator. For example, the color indicator may be displayed as a background color in the portion 130 of the incoming call notification interface 128. The color indicator may serve to advise the call recipient 114 as to whether to answer or reject the call from the caller 110. In one implementation, a red color hue may advise the call recipient 114 to not answer the call, while a green color hue may advise the call recipient 114 that the call is probably safe to answer.

The incoming call notification interface 128 may further present an icon 134 that represents a value of the behavior score 124. In the example shown in FIG. 1, the icon 134 may indicate that the caller 110 is highly trustworthy. The icon 134 may be one of multiple icon variations that are used to indicate the trustworthiness of the caller 110 to the call recipient based on the value of the behavior score 124. In some embodiments, the call classification engine 116 may further determine whether the behavior of a caller falls into either a stalker classification or a robocaller classification. The stalker classification indicates that a caller habitually calls a handful of individuals a large number of times. Accordingly, the behavior score 124 that is generated by the call classification engine 116 may be in the form of a stalker score or a robocaller score. Accordingly, variations of the icon 134 may be used to indicate whether the caller is likely a stalker or robocaller. These variations are illustrated in the example incoming call notification interfaces 202 and 204 shown in FIG. 2.

Figure 2:
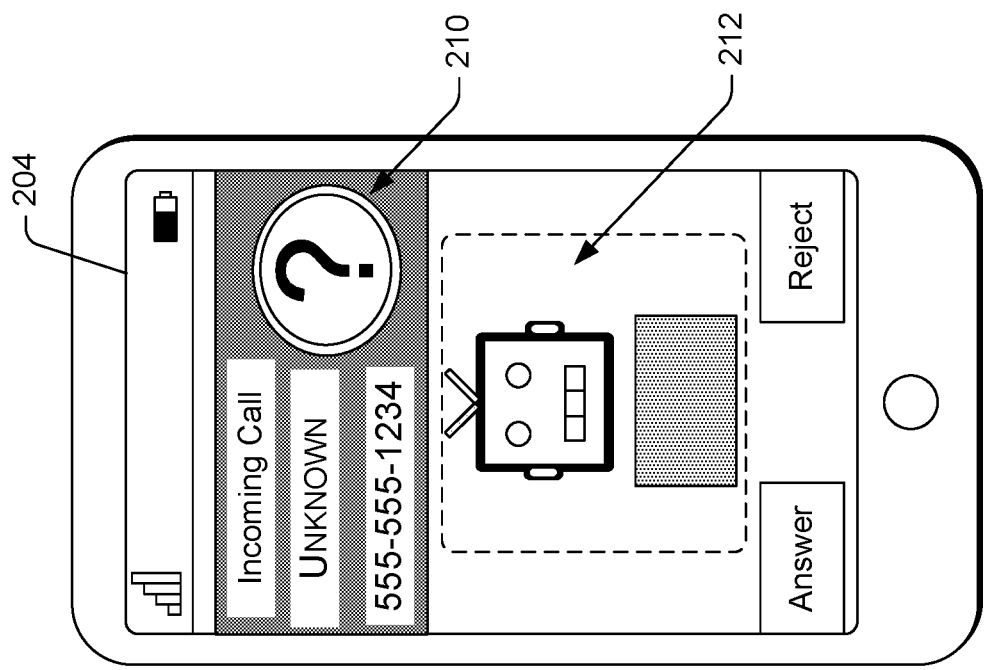
FIG. 2 shows example incoming call screens of a user device that displays multiple indicators for presenting a call recipient with the reliability and behavior assessments of a caller via the incoming call screens.
Figure 2:
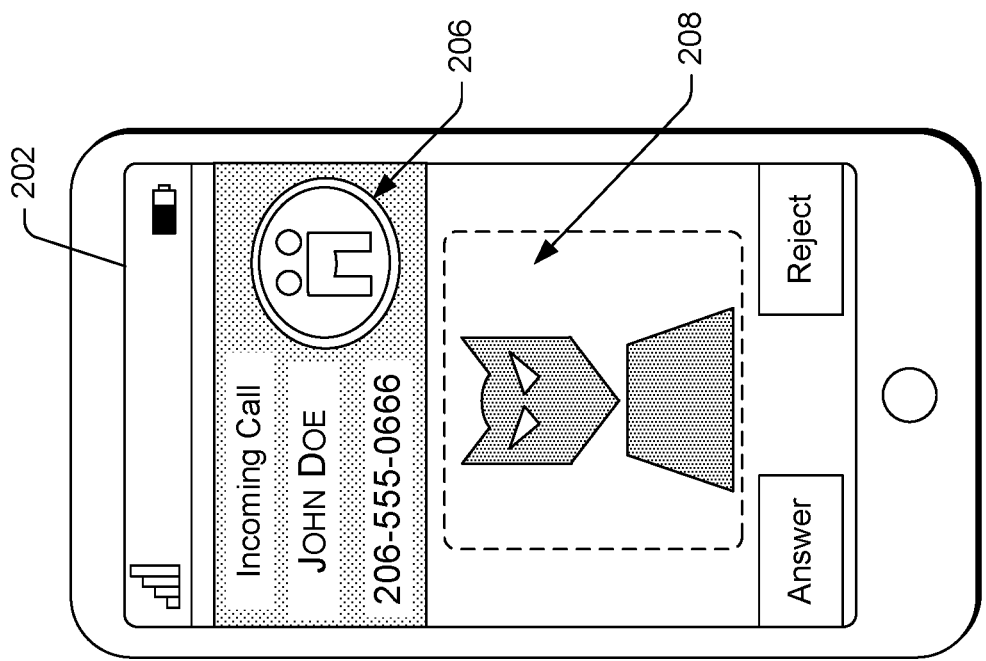

For example, the incoming call notification interface 202 shown in FIG. 2 may present an icon 206 that indicates a caller of an incoming call is known to the call recipient 114. However, an icon 208 indicates that the caller has been classified as a stalker based on the entropy analysis performed by the call classification engine 116. The value of the stalker score that represents the likelihood that the caller is a stalker may be indicated with a color variation of the icon 208 or a background for the icon 208. For example, the stalker score may have a numerical range of 1-10 that correspond to degrees of stalker-like behavior, in which "1" indicates that the caller is least likely to be a stalker and "10" indicates that the caller is most likely to be a stalker. Accordingly, the telephony application 126 may present a first color variation for the stalker score values 1 and 2, a second color variation for the stalker score values 3 and 4, a third color variation for the stalker score values 5 and 6, a fourth color variation for the stalker score values 7 and 8, and a fifth color variation for the stalker score values 9 and 10. However, the stalker score may have other numerical ranges in other embodiments, and the number of color variations that correspond to different numerical subranges may also vary.

In another example, the incoming call notification interface 204 may present an icon 210 that indicates a caller of an incoming call is completely unknown to the call recipient 114, i.e., a stranger. The incoming call notification interface 204 may further present an icon 212 indicating that the caller has been classified as a robocaller based on the entropy analysis performed by the call classification engine 116. The value of the robocaller score that represents the likelihood that the caller is a robocaller may be indicated with color variation of the icon 212 or a background for the icon 212. For example, the robocaller score may have a numerical range of 1-10 that correspond to the likelihood that the caller is a robocaller, in which "1" indicates that the caller is least likely to be a robocaller and "10" indicates that the caller is most likely to be a robocaller. Accordingly, the telephony application 126 may present a first color variation for the robocaller score values 1 and 2, a second color variation for the robocaller score values 3 and 4, a third color variation for the robocaller score values 5 and 6, a fourth color variation for the robocaller score values 7 and 8, and a fifth color variation for the robocaller score values 9 and 10. However, the robocaller score may have other numerical ranges in other embodiments, and the number of color variations that correspond to different numerical subranges may also vary.

Returning to FIG. 1, the colors for each of the reliability score 122 and the behavior score 124 may be presented in different sections of the portion 130 in some other embodiments. In such embodiments, the colors may partially overlap to form a color gradient in the overlapped part that is a combination of both colors. The presentation of the icons and/or colors along with the caller information of the caller via the incoming call notification interface 128 may enable the call recipient 114 to decide whether to answer the incoming call or reject the incoming call. For example, the call recipient 114 may answer the incoming call by selecting or activating the answer control 136. Alternatively, the call recipient 114 may reject the incoming call by selecting or activating the reject control 138.

Example Call Classification Engine

Figure 3:
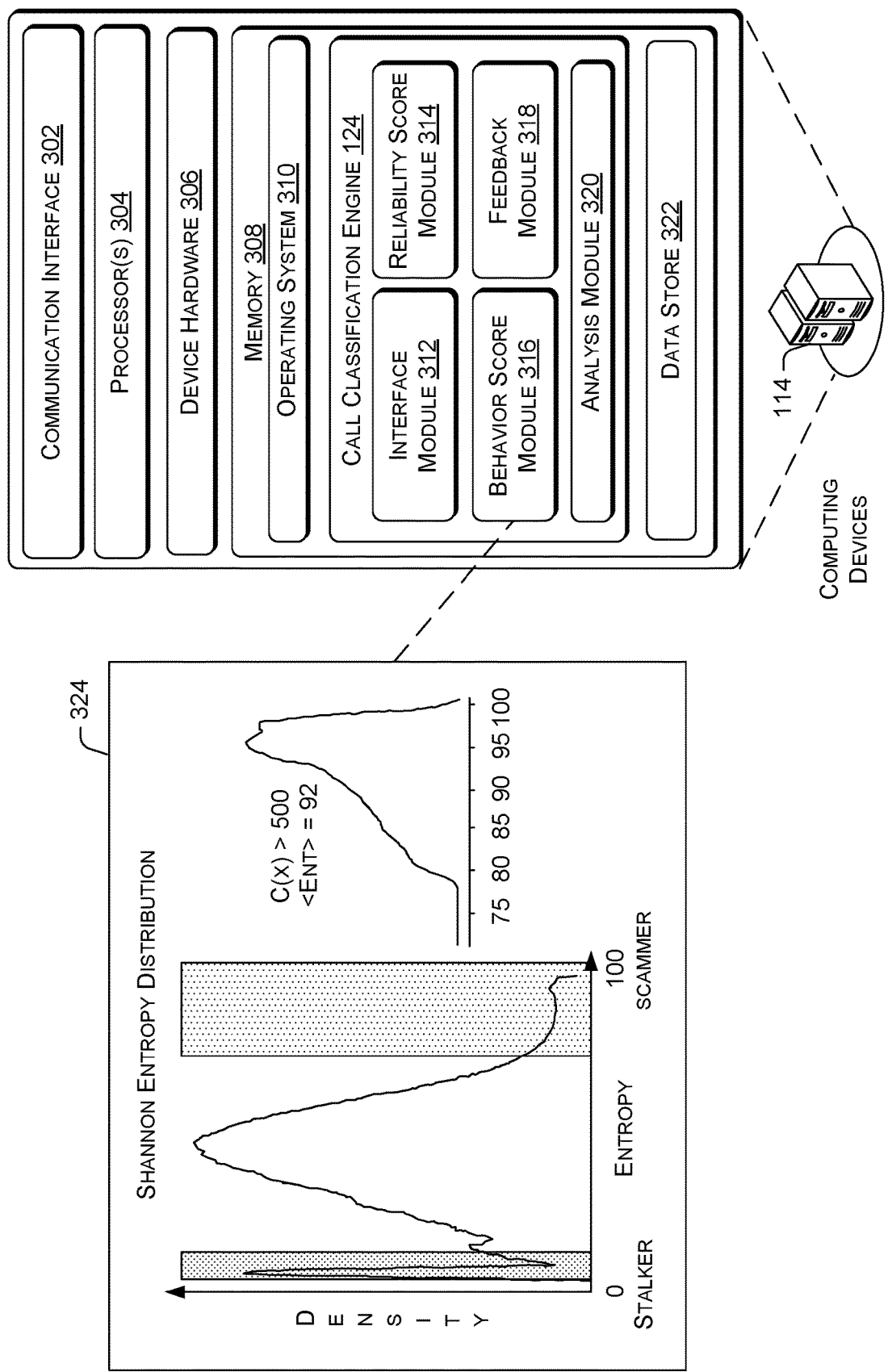
FIG. 3 is a block diagram showing various components of one or more illustrative computing devices that support the reliability and behavior assessments of a caller when the caller places an incoming call to a call recipient.

FIG. 3 is a block diagram showing various components of one or more illustrative computing devices that support the reliability and behavior assessments of a caller when the caller places an incoming call to a call recipient. The computing devices 300 may include a communication interface 302, one or more processors 304, memory 306, and device hardware 308. The communication interface 302 may include wireless and/or wired communication components that enable the computing devices 300 to transmit data to and receive data from other networked devices. The device hardware 308 may include an additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 300 or components thereof may be virtual computing devices in the form of virtual machines or software containers that are hosted in a computing cloud.

The computing devices 300 may implement an operating system 310 and a call classification engine 116. The operating system 310 may include components that enable the computing devices 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system. The operating system 310 may support the operations of the call classification engine 116.

The call classification engine 116 may include an interface module 312, a reliability score module 314, a behavior score module 316, a feedback module 318, and an analysis module 320. Such modules may include routines, program instructions, objects, and/or data structures that are executed by the processors 304 to perform particular tasks or implement particular abstract data types. Further, the call classification engine 116 may have access to a data store 322. The data store 322 may include one or more databases, such as relational databases, object databases, object-relational databases, and/or key-value databases that store the KPIs.

The interface module 312 may detect that an incoming call originating from a telephone number of a caller user device and destined for a terminating telephone number of a recipient user device is being routed by the core network 104. Accordingly, the interface module 312 may pass the telephone numbers of the user caller device and the recipient user device to the reliability score module 314 and the behavior score module 316. In turn, the reliability score module 314 may generate a reliability score and the behavior score module 316 may generate a behavior score for the telephone number. The interface module 312 may provide the reliability score and behavior score to a service of the core network 104 that sends incoming call notifications to recipient user devices. Accordingly, the service of the core network 104 may send an incoming call notification message to the recipient user device that includes the reliability score and the behavior score along with the telephone number of the caller user device. In various embodiments, the interface module 312 may interact with the service of the core network 104 via one or more application program interface (APIs).

Figure 4:
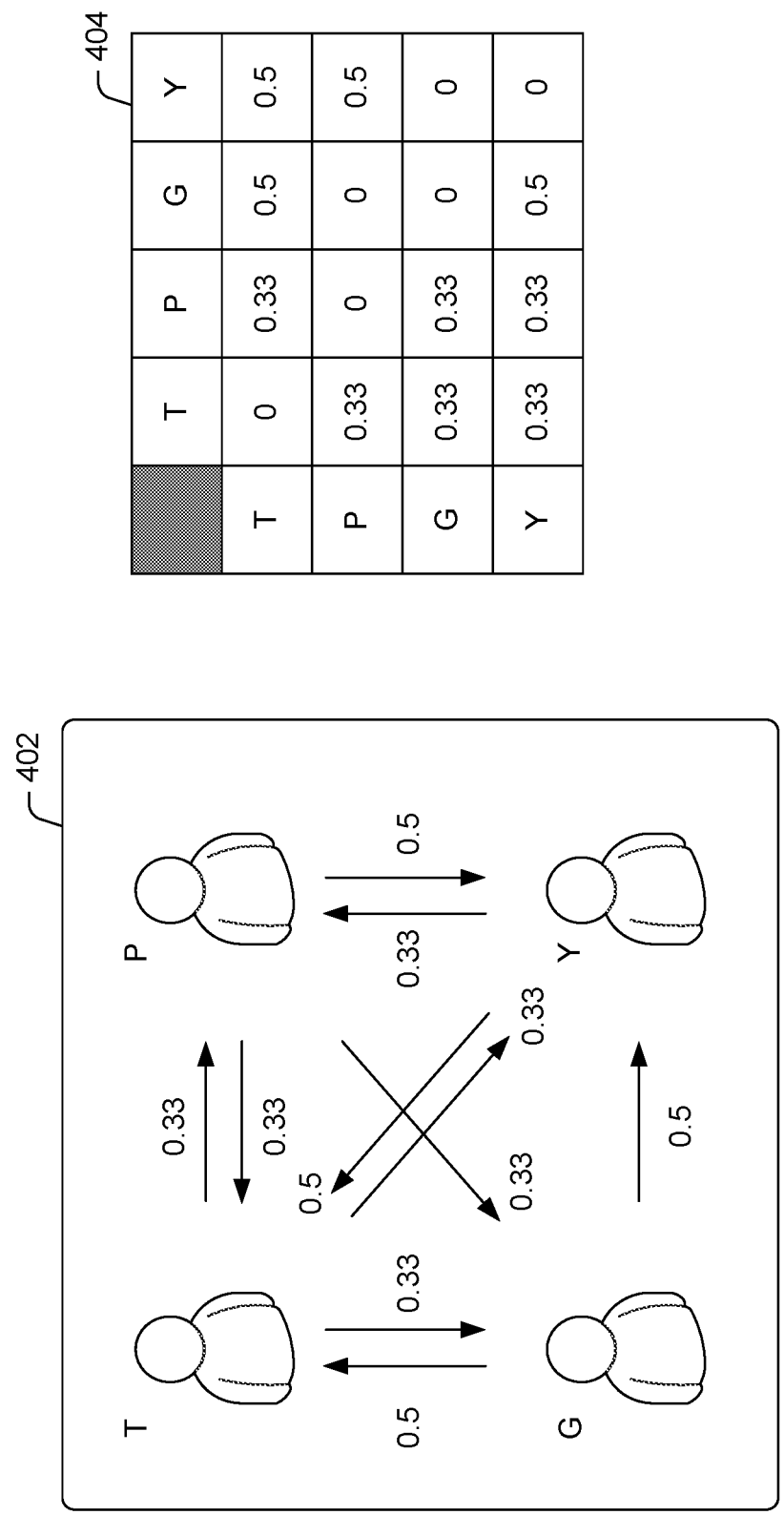
FIG. 4 illustrates an example connectivity graph of calls between individuals and a corresponding adjacency matrix.

The reliability score module 314 may calculate a reliability score for the telephone number of a caller that is placing a telephone call to a terminating telephone number of a call recipient serviced by the wireless carrier network 102. The reliability score module 314 may generate a connectivity graph (e.g., finite graph) that represents connectivity between callers that are serviced by the wireless carrier network 102 based on call record data 120. A caller or a call recipient is serviced by the wireless carrier network 102 when a call for the caller or the call recipient originates or terminates at the wireless carrier network 102. As shown in FIG. 4, an example group of four people calling each other can be mapped to an example graph 402 based on the corresponding call record data. Further, the connectivity between the individuals can be represented by an example adjacency matrix 404. In various embodiments, the nodes of the connectivity graph are the corresponding telephone number of the callers that are connected by edges. The edges of the connectivity graph are made up of connections that contain information on the telephone calls exchanged between the callers. For example, a connection for a pair of telephone numbers may include call quality measurements for the telephone calls exchanged between the corresponding callers, such as time durations of the telephone calls and a frequency of the telephone calls. The reliability score module 314 may use the connectivity graph to compute a corresponding network connectivity value for each node. For example, the network connectivity value for a node may be equivalent to or derived from a number of different call recipients called by a corresponding caller.

The nodes in the connectivity graph may be further ranked via a PageRank algorithm. The nodes are ranked such that a PageRank value of each node is generated based on a corresponding network connectivity value and corresponding call quality measurements associated with each node. The PageRank algorithm may be described as follows:

$$PR_{i+1} = \begin{bmatrix} (1-d)/N \\ (1-d)/N \\ \vdots \\ (1-d)/N \end{bmatrix} + d \begin{bmatrix} \ell(p_1, p_1) & \ell(p_1, p_2) & \cdots & \ell(p_1, p_N) \\ \ell(p_2, p_1) & \ddots & & \vdots \\ \vdots & & \ell(p_i, p_j) & \\ \ell(p_N, p_1) & \cdots & & \ell(p_N, p_N) \end{bmatrix} PR_i$$

$$\sum_{i=1}^{N} \ell(p_i, p_j) = 1$$

in which N is the number of nodes in the network, $l(i,j)$ is an attribute from node i to node j. $PR_i$ is a vector containing PageRank values of i iteration, and d is a damping factor. In other words, the modified PageRank is a power method $PR_{i+1} = H * PR_i$. The power method gives PageRank values when the method is converged, such that $PR_{i+1} - PR_i < Tol$, in which $Tol = 10^{-8}$, H is the adjacency matrix, and $PR_0$ is the initial vector.

The reliability score module 314 may further calculate a community value for the caller that is placing the call to the call recipient based on a graph proximity of the caller to the call recipient in the connectivity graph. For example, each node in the connectivity graph that is directly connected to the node of the caller may have a particular community value. In contrast, nodes that have indirect connections to the node of the caller may have community values that are lower than the particular community value, and nodes that have no direct connections to the node of the caller may have even lower community values. Subsequently, the reliability score module 314 may calculate a reliability score for the caller as a product of a PageRank value of the telephone number associated with the caller and the community value of the caller.

The behavior score module 316 may calculate a reliability score for the telephone number of a caller that is placing a telephone call to a terminating telephone number of a call recipient. The behavior score module 316 may initially generate an entropy value for each caller of a plurality of callers that represents a corresponding telephone number as a distribution of telephone call events to other callers of the plurality of callers. In various embodiments, the plurality of callers includes both the caller and the call recipient. For example, the entropy used to describe the caller through the distribution of calls made by the caller to the call recipients serviced by the wireless carrier network 102 may be the Shannon Entropy, which is expressed as follows:

$$H(X) = \sum_{i=1}^{n} P(x_i) \log_2(P(x_i)) \quad (1)$$

in which $P(x_i)$ is the probability of receiving a call from a telephone number of the caller x, for which $P(x_i)=C(x_i)/C(x)$. Further, $C(x_i)$ represents the number of calls to the call recipients serviced by the wireless carrier network 102 from the telephone number of the caller x, and $C(x)$ is the total number of calls made from the telephone number of the caller x. In various embodiments, the entropy may be normalized as follows:

$$H_{norm}(X) = 100\left(1 - \frac{\sum_{i=1}^{n} C(x_i) \log_2(C(x_i))}{C(x) \log_2(c(x))}\right) \quad (2)$$

Subsequently, the behavior score module 316 may calculate a threshold value for classifying the caller into a stalker classification or a robocaller classification based on an entropy distribution of entropy values for the plurality of callers. In some instances, the calculation may be performed using an entropic thresholding method according to an entropy distribution histogram of the entropy values, such as an example histogram 324. For example, callers with entropy values close to zero may be considered to fall into the stalker classification and callers with entropy values close to 100 may be considered as falling into the robocaller classification. The entropy value for the telephone number of the caller is then compared by the behavior score module 316 to the threshold value to determine whether the caller fits into the stalker classification or the robocaller classification.

Thus, if the caller falls into the stalker classification, the behavior score module 316 may initially generate a call quality value for the telephone number of the caller. The call quality value is generated based on an average of call durations and an average of call frequencies of telephone calls made by the caller to the other callers serviced by the wireless carrier network 102 during a predetermined time period (e.g., a most recent month, a most recent year, a lifetime of service subscription, etc.). In various embodiments, the telephone numbers of the caller and other callers are represented by the nodes of the connectivity graph. Subsequently, the behavior score module 316 may calculate a stalker score for the telephone number of the caller based on the corresponding entropy value and the call quality value for the telephone number of the caller. For example, the stalker score for the telephone number of the caller may be a summation, a product, and/or some other arithmetic combination of the entropy value and the call quality value. The stalker score for the telephone number of the caller is then returned by the behavior score module 316 as the behavior score of the caller.

However, if the caller falls into the robocaller classification, the behavior score module 316 may initially generate a call quality value for the telephone number of the caller. The call quality value is generated based on an average of call durations and an average of call frequencies of telephone calls made by the caller to the other callers serviced by the wireless carrier network 102 during the predetermined time period. In various embodiments, the telephone numbers of the caller and other callers are represented by the nodes of the connectivity graph. Subsequently, the behavior score module 316 may calculate an approximate entropy value for the telephone number of the caller that indicates a periodicity of call behavior with respect to one or more telephone numbers of at least one other caller serviced by the wireless carrier network 102. For example, Approximate Entropy is a technique used to quantify the amount of regularity and the unpredictability of fluctuations over time-series data. Since robocalls tend to show periodicity or abnormal behavior, Approximate Entropy (ApEn) may be used to characterize these anomalies as follows:

$$ApEn = \Phi^m(r) - \Phi^{m+1}(r) \quad (3)$$

$$\Phi^m(r) = (N - m + 1)^{-1} \sum_{i=1}^{N-m+1} \log(C_i^m(r)) \quad (4)$$

$$C_i^m(r) = \frac{\text{number of } x(j) \text{ such that } d[x(i), x(j)] \leq r}{N - m + 1} \quad (5)$$

$$x_i^m = [f(i), \ldots f(i + m - 1)] \quad (6)$$

in which N represents the data values, m is a dimension of the vector and the recommended value is 2, r is the distance which can be calculated as 0.2*standard deviation of values in vector $x_i$, and f is the number of calls per a sample duration (e.g., 15 minutes) made by the caller x. In this way, the behavior score module 316 may calculate the approximate entropy value for the telephone number of the caller.

Subsequently, the behavior score module 316 may calculate a robocaller score for the telephone number of the caller as a combination of the corresponding entropy value, the approximate entropy value, and the call quality value for the telephone number of the caller. For example, the robocaller score for the telephone number of the caller may be a summation, a product, and/or some other arithmetic combination of the entropy value, the approximate entropy value, and the call quality value. The robocaller score for the telephone number of the caller is then returned by the behavior score module 316 as the behavior score of the caller.

The feedback module 318 may use feedback from call recipients to modify the reliability scores and/or behavior scores that are provided to the user devices of the call recipients. The feedback may indicate the accuracy of the reliability and/or behavior scores. For example, the telephony application 126 on a user device 112 may present a feedback interface for the call recipient 114 to provide feedback after the call recipient 114 has answered a call. Such an example feedback interface is illustrated in FIG. 5.

Figure 5:
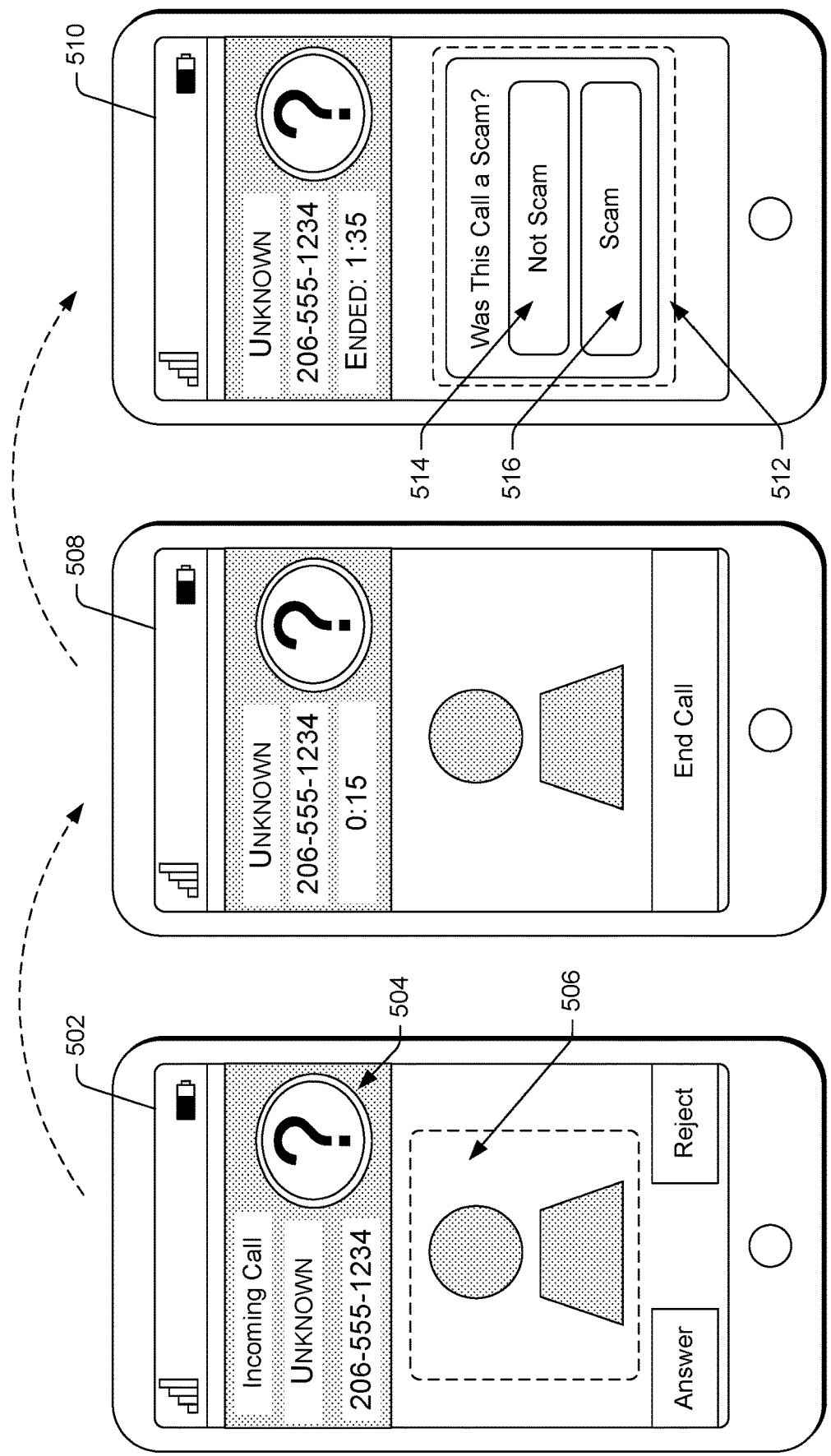
FIG. 5 shows an example user interface of a user device that enables a call recipient to provide feedback regarding whether a received incoming call is a scam call.

As shown in FIG. 5, the user device 112 may present in incoming call notification interface 502. The incoming call notification interface 502 may present an icon 504 that indicates a caller of an incoming call is completely unknown to the call recipient 114, i.e., a stranger. The incoming call notification interface 502 may further present an icon 506 indicating that the call classification engine 116 is unable to classify the caller as either a stalker or scammer due to the lack of call record data for the caller, i.e., the caller is rated as neutral by the corresponding behavior score. The call connect interface 508 shows that the call recipient 114 decided to answer the call and the call is connected. The feedback interface 510 may be displayed by the user device 112 once the call is terminated. The feedback interface 510 may present a selection menu 512 that enables the call recipient 114 to indicate whether the call was a scam call or not a scam call. For example, the user may select the menu item 514 to indicate that the call was not a scam. In contrast, the user may select the menu item 516 to indicate that the call is a scam. The feedback from the call recipient 114 is then sent by the user device 112 to the feedback module 318 of the call classification engine 116.

Returning to FIG. 3, the feedback module 318 may modify the reliability and/or behavior classifications of a specific caller based on the feedback. For example, when the feedback indicates that a call from the specific caller is a non-scam call, the feedback module 318 may cause the behavior score module 316 increases a call quality value for the telephone number associated with the call. The increase in quality value may decrease the likelihood that the corresponding calculated behavior score will indicate that the calls originating from the telephone are stalker calls or robocalls. On the other hand, when the feedback indicates that the call from the specific caller is a scam call, the feedback module 318 may cause the behavior score module 316 to decrease a call quality value for the telephone number associated with the call. The decrease in quality value may increase the likelihood that the corresponding calculated behavior score will indicate that the calls originating from the telephone are stalker calls or robocalls.

In additional embodiments, the feedback module 318 may receive feedback from a feedback interface of a user device belonging to a particular call recipient that indicates the specific caller is a friend rather than a stranger. In such embodiments, the feedback module 318 may direct the reliability score module 314 to automatically generate a reliability score for the particular call recipient that indicates the specific caller is a friend for future incoming calls from the specific caller to the particular call recipient. For example, the feedback module 318 may generate a special flag entry that commands the reliability score module 314 to override any actual calculated reliability score for the relationship between the specific caller and the particular call recipient with a strongest friend score.

Conversely, the feedback module 318 may receive feedback from a feedback interface of the user device indicating that the specific caller is a complete stranger to the particular call recipient. In such a scenario, the feedback module 318 may direct the reliability score module 314 to automatically generate a reliability score for the particular call recipient that indicates the specific caller is a stranger for future incoming calls from the specific caller to the particular call recipient. For example, the feedback module 318 may generate a special flag entry that commands the reliability score module 314 to override any actual calculated reliability score for the relationship between the specific caller and the particular call recipient with a strongest stranger score.

The analysis module 320 may perform analysis and reporting functions with respect to telephone numbers of callers. In some instances, the analysis module 320 may generate a visual map of the geographical locations of the suspected scam telephone numbers. For example, a suspected scam telephone number is a telephone number whose associated robocaller score exceeds a predetermined value threshold. The visual map may assist personnel of the wireless carrier network 102 in determining the geographical distribution of the suspected scam telephone numbers. In another instance, the analysis module 320 may analyze the call record data of a scam telephone number to determine whether the telephone number is being spoofed by scammers. For example, the telephone number may be spoofed when the telephone number appears to simultaneously originate multiple calls to different call recipients. Thus, if the telephone number being spoofed belongs to a subscriber of the wireless carrier network and the frequency of spoofing exceeds a frequency threshold, the analysis module 320 may generate a report that prompts a customer service representative to contact the subscriber to resolve the issue. For example, the customer service representative may offer to assign the subscriber an alternative telephone number and then add the number of a list of scam telephone numbers. In additional instances, the analysis module 320 may generate reports of suspected scam telephone numbers that can be electronically delivered to the computing devices of other MNOs and government agencies via a network.

The data store 322 may store data that are used by the modules of the call classification engine 116 and values computed by the modules of the call classification engine 116. For example, the data store may store the call record data of the callers, the connectivity graph, as well as PageRank values, threshold values, entropy values, call quality measurements, call quality values, approximate entropy values, reliability scores, behavior scores, etc. related to the telephone numbers of callers that are serviced by the wireless carrier network 102.

Example Computing Device Components

Figure 6:
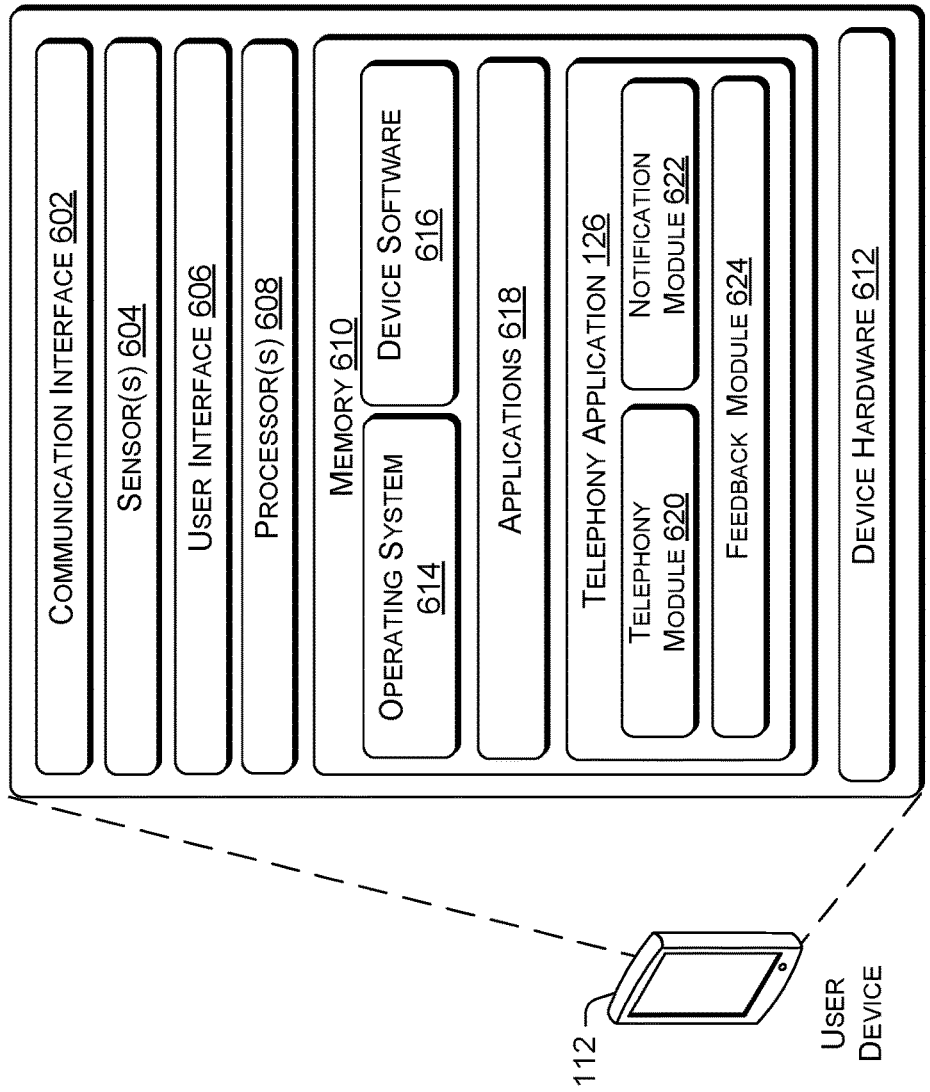
FIG. 6 is a block diagram showing various components of an illustrative user device that displays multiple indicators representing the calculated reliability score and behavior score for an incoming call.

FIG. 6 is a block diagram showing various components of an illustrative user device that displays multiple indicators representing the calculated reliability score and behavior score for an incoming call. The user device 112 may include a communication interface 602, one or more sensors 604, a user interface 606, one or more processors 608, memory 610, and device hardware 612. The communication interface 602 may include wireless and/or wired communication components that enable the electronic device to transmit or receive voice or data communication via the wireless carrier network, as well as other telecommunication and/or data communication networks. The sensors 604 may include a proximity sensor, a compass, an accelerometer, biometric sensors, cameras, and/or a global positioning system (GPS) sensor, among other appropriate sensors. The proximity sensor may detect the movement of objects that are proximate to the user device 112. The compass, the accelerometer, and the GPS sensor may detect orientation, movement, and geolocation of the user device 112. The cameras may capture images of the environment around the user device 112.

The user interface 606 may enable a user to provide input and receive output from the user device 112. The user interface 606 may include a data output device (e.g., a visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 610 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 612 may include a cellular modem that enables the user device 112 to perform telecommunication and data communication with one or more wireless carrier networks, as well as a short-range transceiver that enables the device to connect to other devices via short-range wireless communication links. The device hardware 612 may further include signal converters, antennas, hardware decoders and encoders, graphics processors, and/or the like that enable the user device 112 to execute applications and provide telecommunication and data communication functions. The cellular modem may be driven by modem software to perform telecommunication and data communication with a wireless communication network. The modem software may be firmware that is stored in dedicated non-volatile memory of the user device 112. Such non-volatile memory may include read-only memory (ROM), erasable programmable read-only memory (EPROM), or flash memory. The user device may be further equipped with a subscriber identity module (SIM).

The one or more processors 608 and the memory 610 of the user device 112 may implement an operating system 614, device software 616, one or more applications 618, and the telephony application 126. Such software may include routines, program instructions, objects, and/or data structures that are executed by the processors 608 to perform particular tasks or implement particular abstract data types.

The operating system 614 may include components that enable the user device 112 to receive and transmit data via various interfaces (e.g., user controls, communication interface 602, and/or memory input/output devices). The operating system 614 may also process data using the one or more processors 608 to generate output based on input that is received via the user interface 606. For example, the operating system 614 may provide an execution environment for the execution of the applications 618. The operating system 614 may include a presentation component that presents the output (e.g., display the data on an electronic display, store the data in memory, transmit the data to another electronic device, etc.).

The operating system 614 may include an interface layer that enables applications to interface with the modem and/or the communication interface 602. The interface layer may comprise public APIs, private APIs, or a combination of both public APIs and private APIs. Additionally, the operating system 614 may include other components that perform various other functions generally associated with an operating system. The device software 616 may include software components that enable the user device to perform functions. For example, the device software 616 may include basic input/output system (BIOS), bootrom, or a bootloader that boots up the user device 112 and executes the operating system 614 following power-up of the device.

The applications 618 may include applications that provide utility, entertainment, and/or productivity functionalities to a user of the user device 112. For example, the applications 618 may include electronic mail applications, remote desktop applications, web browser applications, navigation applications, office productivity applications, multimedia streaming applications, an online shopping application, and/or so forth.

The telephony application 126 may include a telephony module 620, a notification module 622, and a feedback module 624. Such modules may include routines, program instructions, objects, and/or data structures that are executed by the processors 608 to perform particular tasks or implement particular abstract data types. In various embodiments, the telephony application 126 may be an over-the-top (OTT) application or an application that is integrated into the operating system 614.

The telephony module 620 may provide functions and interfaces for a user to place and answer telephone calls. These functions may include a dialer function, a call answer function, a speakerphone function, a conference call function, a multimedia call function, an address book function, a voicemail retrieval function, and/or so forth. The user may interact with the functions of the telephony module 620 via the user interface 606. The notification module 622 may work in conjunction with the telephony module 620 to generate incoming call notification interfaces that display multiple indications, such as the various call notification interfaces that are shown in FIGS. 1, 2, and 4. The multiple indications may include a first indication that represents a value of the reliability score and a second indication that represents a value of the behavior score. In various embodiments, the call classification engine 116 may send the scores to the telephony application 126 as a part of incoming call notification messaging. The scores are then intercepted by the notification module 622 for processing into the indications. Each of the indications may include a color, an icon, or a combination of a color and an icon that corresponds to a score.

The feedback module 624 may be configured to provide feedback interfaces that enable a call recipient to input feedbacks regarding the nature of callers via the user interface 606. The feedback module 624 may be configured to provide such feedback interfaces following the termination of incoming calls, such as the feedback interface 410. In various instances, a feedback interface provided by the feedback module 624 may enable a call recipient to indicate whether a caller is a scammer or a non-scammer. In other instances, a feedback interface provided by the feedback module 624 may enable the call recipient to indicate whether the caller is a stranger or a friend.

Example Processes

FIGS. 7-10 present illustrative processes 700-1000 for implementing multi-factor scam call detection and alerting. Each of the processes 700-1000 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 700-1000 are described with reference to the architecture 100 of FIG. 1.

Figure 7:
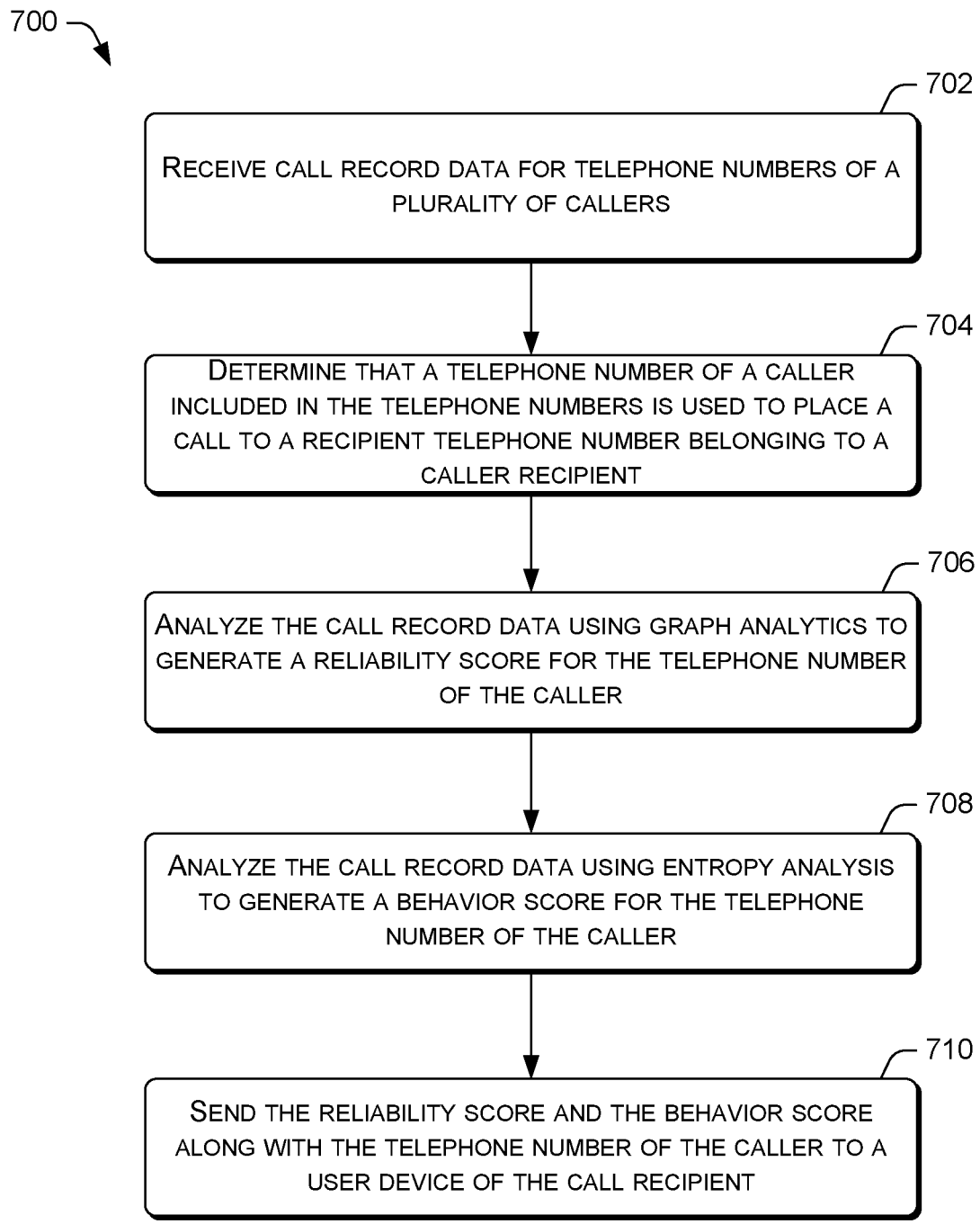
FIG. 7 is a flow diagram of an example process for generating a behavior score and a reliability score for an incoming call from a caller.

FIG. 7 is a flow diagram of an example process 700 for generating a behavior score and a reliability score for an incoming call from a caller. At block 702, the call classification engine 116 may receive call record data for telephone numbers of a plurality of callers. The call record data of individual callers may include CDRs that contain various attributes of calls made by the individual callers. At block 704, the call classification engine 116 may determine that a telephone number of a caller included in the telephone numbers is used to place a call to a recipient telephone number belonging to a call recipient.

At block 706, the call classification engine 116 may analyze the call record data using graph analytics to generate a reliability score for the telephone number of the caller. For example, the reliability score may represent a likelihood that the caller is someone that is known to the call recipient. At block 708, the call classification engine 116 may analyze the call record data using entropy analysis to generate a behavior score for the telephone number of the caller. For example, the behavior score may represent a behavior trustworthiness of the caller. At block 710, the call classification engine 116 may send the reliability score and the behavior score along with the telephone number of the caller to a user device of the call recipient.

Figure 8:
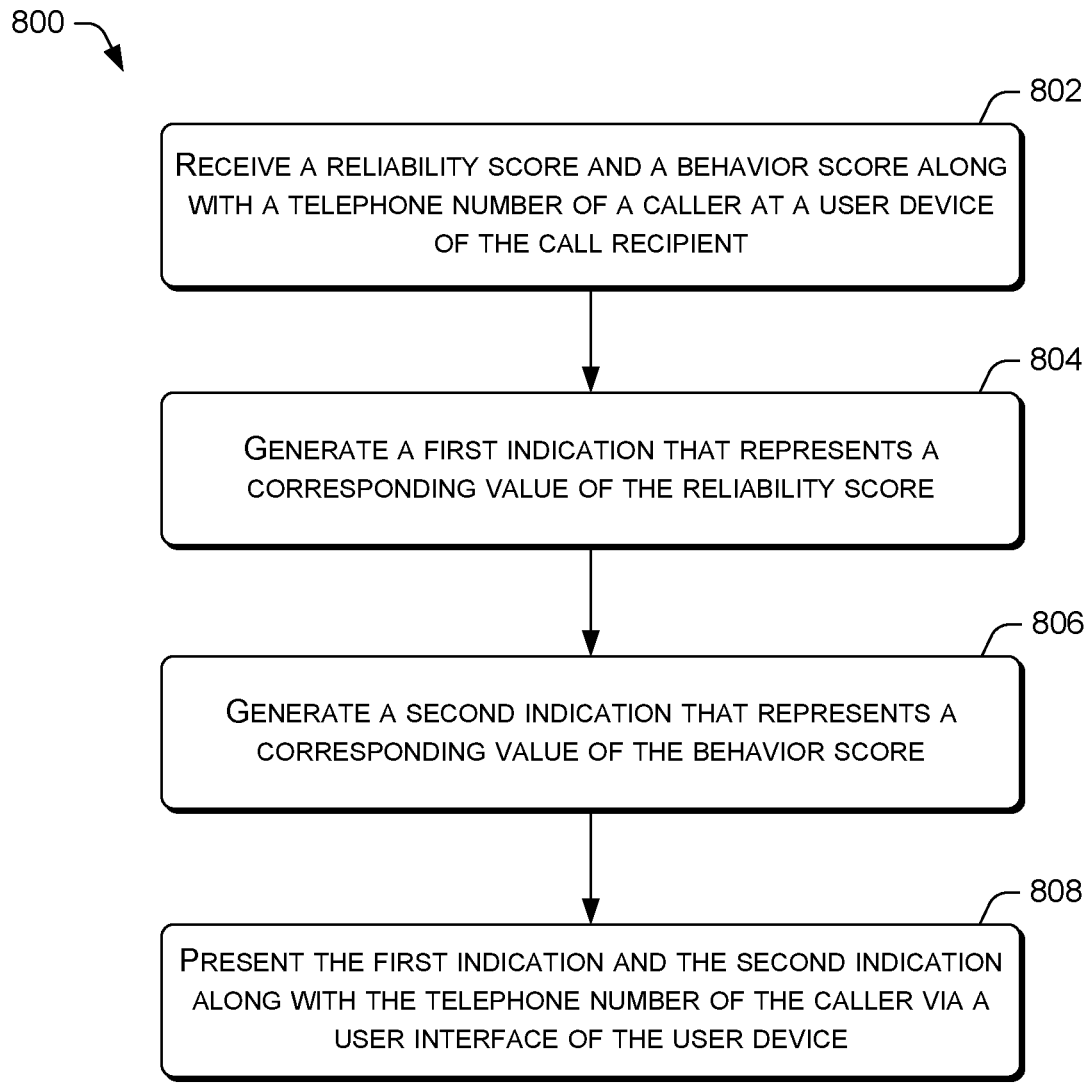
FIG. 8 is a flow diagram of an example process for a user device to displays multiple indicators representing the calculated reliability score and behavior score for an incoming call.

FIG. 8 is a flow diagram of an example process 800 for a user device to displays multiple indicators representing the calculated reliability score and behavior score for an incoming call. At block 802, a user device of a call recipient may receive a reliability score and a behavior score along with a telephone number of a caller. For example, the user device may be the user device 112 of the call recipient 114. In various embodiments, a telephony application on the user device may receive the reliability score, the behavior score, and the telephone number of the caller.

At block 804, the telephony application may generate a first indication that represents a corresponding value of the reliability score. For example, the first indication for the reliability score may include a color, an icon, or a combination of a color and an icon that corresponds to the value of the reliability score. At block 806, the telephony application may generate a second indication that represents a corresponding value of the behavior score. For example, the second indication for the behavior score may include a color, an icon, or a combination of a color and an icon that corresponds to the value of the behavior score. At block 808, the telephony application may present the first indication and the second indication along with the telephone number of the caller via a user interface of the user device.

Figure 9:
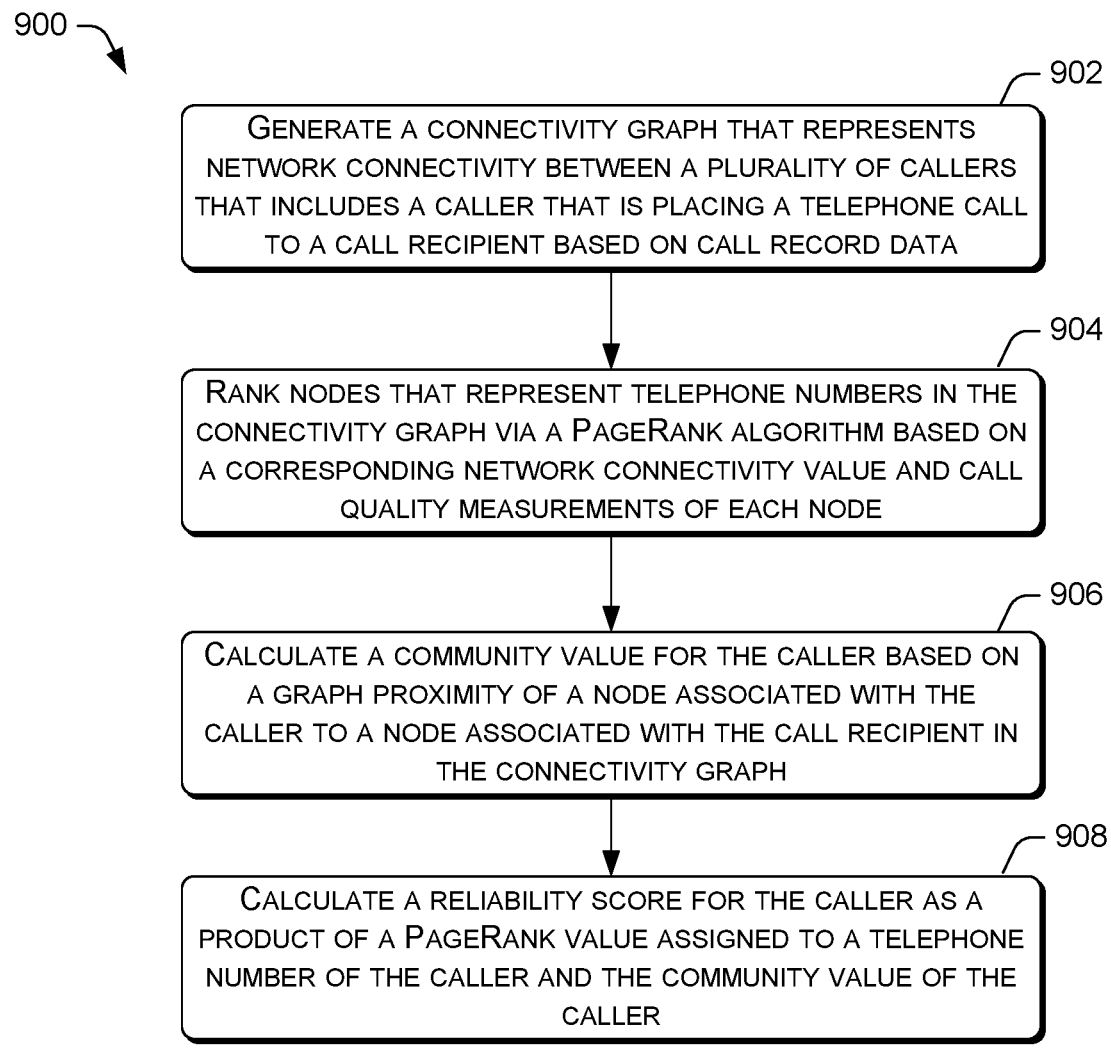
FIG. 9 is a flow diagram of an example process for calculating a reliability score for an incoming call that is placed to a call recipient.

FIG. 9 is a flow diagram of an example process 900 for calculating a reliability score for an incoming call that is placed to a call recipient. The example process 900 further describes the block 706 of the process 700. At block 902, the call classification engine 116 may generate a connectivity graph that represents network connectivity between a plurality of caller based on call record data. The plurality callers are serviced by the wireless carrier network 102. The plurality of callers may include a caller that is placing a telephone call to a call recipient. The call record data of individual callers, which includes the caller and the call recipient, may include a CDR that contains various attributes of calls made by the caller.

At block 904, the call classification engine 116 may rank nodes that represent telephone numbers in the connectivity graph via a PageRank algorithm based on corresponding network connectivity value and call quality measurements of each node. In various embodiments, the call quality measurements of a node may include time durations of the telephone calls and a frequency of the telephone calls initiated or received by the corresponding telephone number associated with the node. At block 906, the call classification engine 116 may calculate a community value for the caller based on a graph proximity of a node associated with the caller to a node associated with the call recipient in the connectivity graph. For example, each node in the connectivity graph that is directly connected to the node of the caller may have a particular community value. In contrast, nodes that have indirect connections to the node of the caller may have community values that are lower than the particular community value, and nodes that have no direct connections to the node of the caller may have even lower community values. At block 908, the call classification engine 116 may calculate a reliability score for the caller as a product of a PageRank value assigned to a telephone number of the caller and the community value of the caller.

Figure 10A:
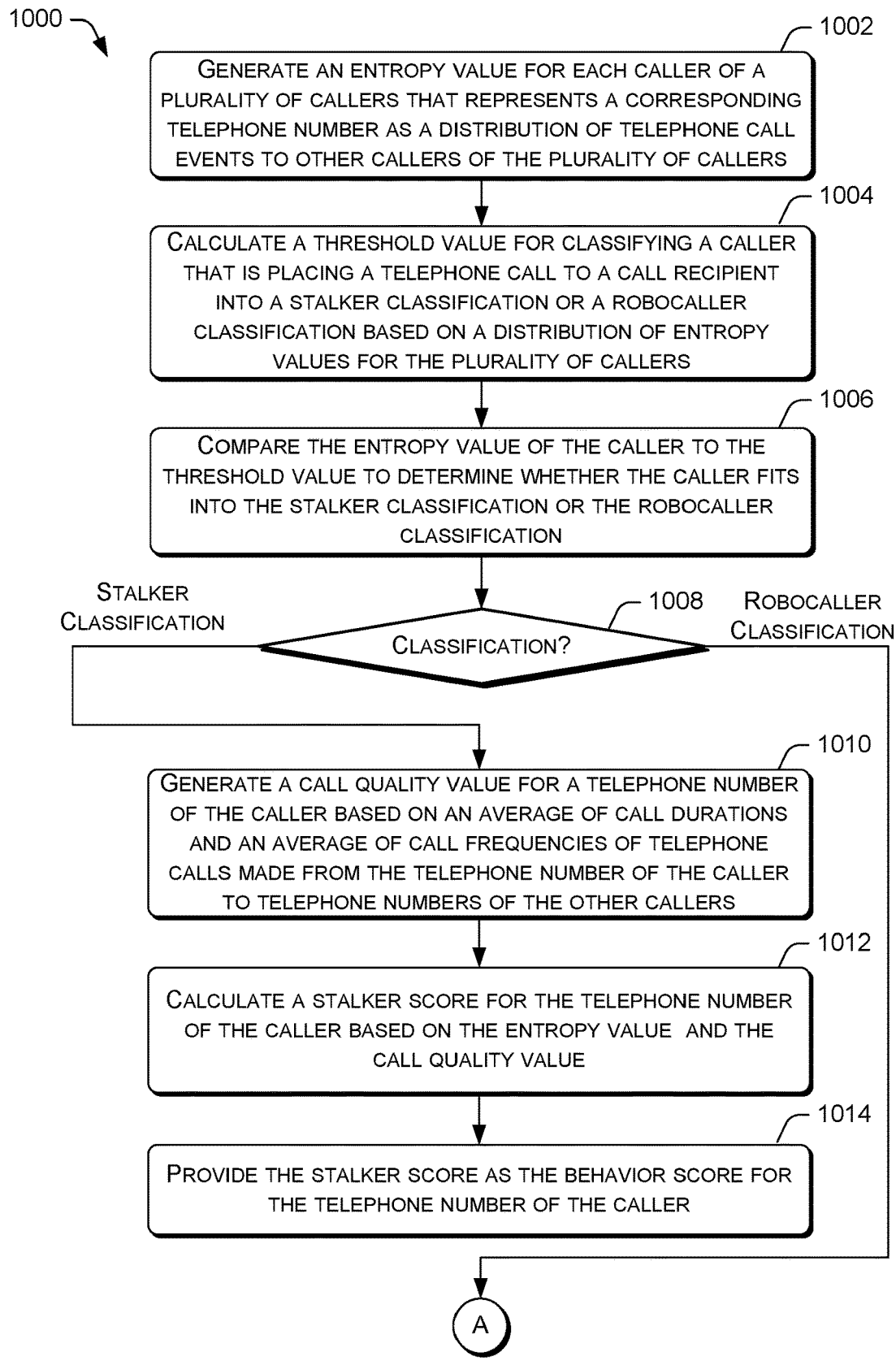
FIGS. 10a and 10b illustrate a flow diagram of an example process for calculating a behavior score for an incoming call that is placed to a call recipient.
Figure 10B:
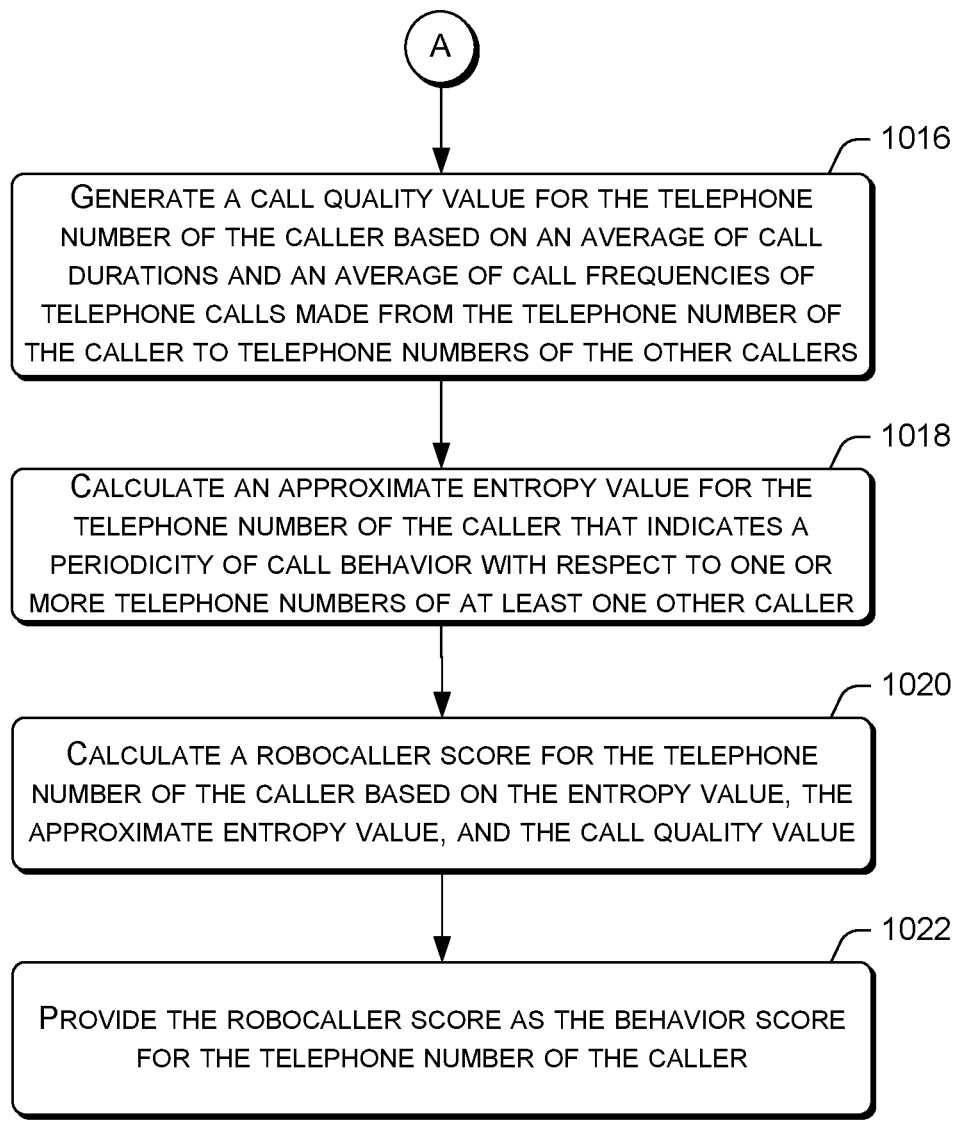

FIGS. 10*a* and 10*b* illustrate a flow diagram 1000 of an example process for calculating a behavior score for an incoming call that is placed to a call recipient. The example process 1000 further describes block 708 of the process 700. At block 1002, the call classification engine 116 may generate an entropy value for each caller of a plurality of callers that represents a corresponding telephone number as a distribution of telephone call events to other callers of the plurality of callers. The plurality callers are serviced by the wireless carrier network 102.

At block 1004, the call classification engine 116 may calculate a threshold value for classifying a caller that is placing a telephone call to a call recipient into a stalker classification or a robocaller classification based on a distribution of entropy values for the plurality of callers. In various embodiments, the calculation may be performed using an entropic thresholding method according to an entropy distribution histogram of the entropy values.

At block 1006, the call classification engine 116 may compare the entropy value of the caller to the threshold value to determine whether the caller fits into the stalker classification or the robocaller classification. For example, the caller may fit into the stalker classification if the entropy value of the caller is less than the threshold value. Conversely, the caller may fit into the robocaller classification if the entropy value of the caller is equal to or more than the threshold value. At decision block 1008, if the call classification engine 116 determines that the caller fits into the stalker classification, the process 1000 proceeds to block 1010.

At block 1010, the call classification engine 116 may generate a call quality value for a telephone number of the caller based on an average of call duration and an average of call frequencies of the telephone calls made from the telephone number of the caller to the telephone numbers of other callers of the plurality of callers during a predetermined time period. At block 1012, the call classification engine 116 may calculate a stalker score for the telephone number of the caller based on the entropy value and the call quality value.

For example, the stalker score for the telephone number of the caller may be a summation, a product, and/or some other arithmetic combination of the entropy value and the call quality value. At block 1014, the call classification engine 116 may provide the stalker score as the behavior score for the telephone number of the caller.

Returning to decision block 1008, if the call classification engine 116 determines that the caller fits into the robocaller classification, the process 1000 proceeds to block 1016. At block 1016, the call classification engine 116 may generate a call quality value for the telephone number of the caller based on an average of call duration and an average of call frequencies of the telephone calls made from the telephone number of the caller to the telephone numbers of other callers of the plurality of callers during the predetermined time period. At block 1018, the call classification engine 116 may calculate an approximate entropy value for the telephone number of the caller that indicates a periodicity of call behavior with respect to one or more telephone number of at least one other caller. Approximate Entropy is a technique used to quantify the amount of regularity and the unpredictability of fluctuations over time-series data. At block 1020, the call classification engine 116 may calculate a robocaller score for the telephone number of the caller based on the entropy value, the approximate entropy value, and the call quality value. For example, the robocaller score for the telephone number of the caller may be a summation, a product, and/or some other arithmetic combination of the entropy value, the approximate entropy value, and the call quality value. At block 1022, the call classification engine 116 may provide the robocaller score as the behavior score for the telephone number of the caller.

The use of the multiple indications on an incoming call notification interface that correspond to a reliability score and a behavior score may provide a call recipient with more information than solely available from a caller ID function or a scam alerting function. The additional information may enable a call recipient to make a more informed decision as to whether to reject or answer an incoming call from the caller. The provision of such useful information to a call recipient may increase user satisfaction with a mobile network operator (MNO) that operates the wireless carrier network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   generating a connectivity graph that represents network connectivity between a plurality of callers serviced by a wireless carrier network based on call record data, wherein nodes of the connectivity graph are corresponding telephone numbers of the plurality of callers and edges of the connectivity graph include information on telephone calls exchanged between the plurality of callers, each edge including call quality measurements for a corresponding telephone number that comprise a duration of a corresponding telephone call between a pair of callers and a frequency of telephone calls between the pair of callers;
   ranking the nodes in the connectivity graph via a PageRank algorithm such that a PageRank value of each node that represents a telephone number of a corresponding caller is generated based on a corresponding network connectivity value and corresponding call quality measurements associated with each node;
   calculating a community value for a caller of the plurality of callers that is placing a call to a call recipient of the plurality of callers based on a graph proximity of the caller to the call recipient as indicated by the connectivity graph; and
   calculating a reliability score for the caller as a product of the PageRank value of the telephone number of the caller and the community value of the caller.

2. The one or more non-transitory computer-readable media of claim 1, wherein the acts further comprise:
   generating entropy values for the plurality of callers such that each entropy value represents a corresponding telephone number of an individual caller as a distribution of telephone call events to other callers of the plurality of callers;
   calculating a threshold value for classifying the caller into a stalker classification or a robocaller classification based on a distribution of the entropy values for the plurality of callers; and
   comparing the entropy value of the caller to the threshold value to determine whether the telephone number of the caller fits into the stalker classification or the robocaller classification.

3. The one or more non-transitory computer-readable media of claim 2, wherein in response to determining that the telephone number fits into the stalker classification:
   generating a call quality value of the caller based on an average of call durations and an average of call frequencies of telephone calls from the telephone number of the caller to telephone numbers of other callers during a predetermined time period; and
   calculating a stalker score for the telephone number of the caller based on the entropy value and the call quality value of the caller, wherein the stalker score is a form of a behavior score.

4. The one or more non-transitory computer-readable media of claim 3, wherein the acts further comprise sending the reliability score, the behavior score, and the telephone number of the caller to a user device of the call recipient for the user device to generate a first indication that represents a value of the reliability score and a second indication that represents a value of the behavior score for display along with the telephone number.

5. The one or more non-transitory computer-readable media of claim 4, wherein the first indication includes at least one of a first color or a first icon that corresponds to a value of the reliability score, and wherein the second indication includes at least one of a second color or a second icon that corresponds to a value of the behavior score.

6. The one or more non-transitory computer-readable media of claim 4, wherein the acts further comprise:
   receiving feedback regarding an accuracy of at least one of the reliability score and the behavior score for the caller from the user device; and
   modifying the at least one of the reliability score and the behavior score generated for an additional telephone call from the caller to the call recipient based on the feedback.

7. The one or more non-transitory computer-readable media of claim 4, wherein the acts further comprise generating an analysis report regarding suspected scam telephone numbers being used by scammers that are identified via corresponding behavior scores or spoofed telephone numbers of the suspected scam telephone numbers used by the scammers.

8. The one or more non-transitory computer-readable media of claim 2, wherein in response to determining that the telephone number is likely associated with the robocaller classification:
   generating a call quality value of the caller based on an average of call durations and an average of call frequencies of telephone calls from the telephone number of the caller to the telephone numbers of the plurality of callers during a predetermined time period;
   calculating an approximate entropy value for the telephone number of the caller that indicates a periodicity of call behavior with respect to one or more telephone numbers of at least one caller in the plurality of callers; and
   calculating a robocaller score based on the entropy value, the approximate entropy value, and the call quality value of the caller, wherein the robocaller score is a form of a behavior score.

9. The one or more non-transitory computer-readable media of claim 8, wherein the acts further comprise sending the reliability score, the behavior score, and the telephone number of the caller to a user device of the call recipient for the user device to generate a first indication that represents a value of the reliability score and a second indication that represents a value of the behavior score for display along with the telephone number.

10. The one or more non-transitory computer-readable media of claim 9, wherein the first indication includes at least one of a first color or a first icon that corresponds to a value of the reliability score, and wherein the second indication includes at least one of a second color or a second icon that corresponds to a value of the behavior score.

11. The one or more non-transitory computer-readable media of claim 9, wherein the acts further comprise:
   receiving feedback regarding an accuracy of at least one of the reliability score and the behavior score for the caller from the user device; and
   modifying the at least one of the reliability score and the behavior score generated for an additional telephone call from the caller to the call recipient based on the feedback.

12. The one or more non-transitory computer-readable media of claim 9, wherein the acts further comprise generating an analysis report regarding suspected scam telephone numbers being used by scammers that are identified via corresponding behavior scores or spoofed telephone numbers of the suspected scam telephone numbers used by the scammers.

13. The one or more non-transitory computer-readable media of claim 1, wherein the reliability score represents a likelihood that the caller is someone that is known to the call recipient.

14. A computer-implemented method, comprising:
   generating, at one or more computing devices, a connectivity graph that represents network connectivity between a plurality of callers serviced by a wireless carrier network based on call record data, wherein nodes of the connectivity graph are corresponding telephone numbers of the plurality of callers and edges of the connectivity graph include information on telephone calls exchanged between the plurality of callers, each edge including call quality measurements for a corresponding telephone number that comprise a duration of a corresponding telephone call between a pair of callers and a frequency of telephone calls between the pair of callers;
   ranking, at one or more computing devices, the nodes in the connectivity graph via a PageRank algorithm such that a PageRank value of each node that represents a telephone number of a corresponding caller is generated based on a corresponding network connectivity value and corresponding call quality measurements associated with each node;
   calculating, at the one or more computing devices, a community value for a caller of the plurality of callers that is placing a call to a call recipient of the plurality of callers based on a graph proximity of the caller to the call recipient as indicated by the connectivity graph; and
   calculating, at the one or more computing devices, a reliability score for the caller as a product of the PageRank value of the telephone number of the caller and the community value of the caller.

15. The computer-implemented method of claim 14, comprising:
   generating, at the one or more computing devices, entropy values for the plurality of callers such that each entropy value represents a corresponding telephone number of an individual caller as a distribution of telephone call events to other callers of the plurality of callers;
   calculating, at the one or more computing devices, a threshold value for classifying the caller into a stalker classification or a robocaller classification based on a distribution of the entropy values for the plurality of callers; and
   comparing, at the one or more computing devices, the entropy value of the caller to the threshold value to determine whether the telephone number of the caller fits into the stalker classification or the robocaller classification.

16. The computer-implemented method of claim 15, wherein in response to determining that the telephone number fits into the stalker classification:
   generating a call quality value of the caller based on an average of call durations and an average of call frequencies of telephone calls from the telephone number of the caller to telephone numbers of other callers during a predetermined time period; and
   calculating a stalker score for the telephone number of the caller based on the entropy value and the call quality value of the caller, wherein the stalker score is a form of a behavior score.

17. The computer-implemented method of claim 16, further comprising sending the reliability score, the behavior score, and the telephone number of the caller to a user device of the call recipient for the user device to generate a first indication that represents a value of the reliability score and a second indication that represents a value of the behavior score for display along with the telephone number.

18. The computer-implemented method of claim 15, wherein in response to determining that the telephone number is likely associated with the robocaller classification:
   generating a call quality value of the caller based on an average of call durations and an average of call frequencies of telephone calls from the telephone number of the caller to the telephone numbers of the plurality of callers during a predetermined time period;

calculating an approximate entropy value for the telephone number of the caller that indicates a periodicity of call behavior with respect to one or more telephone numbers of at least one caller in the plurality of callers; and calculating a robocaller score based on the entropy value, the approximate entropy value, and the call quality value of the caller, wherein the robocaller score is a form of a behavior score.

19. The computer-implemented method of claim 18, further comprising sending the reliability score, the behavior score, and the telephone number of the caller to a user device of the call recipient for the user device to generate a first indication that represents a value of the reliability score and a second indication that represents a value of the behavior score for display along with the telephone number.

20. A system, comprising:
one or more processors; and
memory including a plurality of computer-executable components that are executable by the one or more processors to perform a plurality of actions, the plurality of actions comprising:

receiving call record data for telephone numbers of callers that are used to placed telephone calls to other callers of a plurality of callers;

determining that a telephone number of a caller included in the telephone numbers is used to place a telephone call to a recipient telephone number belonging to a call recipient;

analyzing the call record data using graph analytics to generate a reliability score for the telephone number that at least represents a likelihood that the caller is someone that is known to the call recipient;

analyzing the call record data using entropy analysis to generate a behavior score for the telephone number that at least represents a behavior trustworthiness of the caller; and sending the reliability score, the behavior score, and the telephone number of the caller to a user device of the call recipient for the user device to generate a first indication that represents a value of the reliability score and a second indication that represents a value of the behavior score for display along with the telephone number.

* * * * *